United States Patent
Wu

(10) Patent No.: US 10,935,690 B2
(45) Date of Patent: Mar. 2, 2021

(54) METHODS FOR INVERTING ELECTROMAGNETIC LOGGING MEASUREMENTS

(71) Applicant: Schlumberger Technology Corporation, Sugar Land, TX (US)

(72) Inventor: Peter T. Wu, Missouri City, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 475 days.

(21) Appl. No.: 15/775,353

(22) PCT Filed: Oct. 14, 2016

(86) PCT No.: PCT/US2016/056948
§ 371 (c)(1),
(2) Date: May 10, 2018

(87) PCT Pub. No.: WO2017/083053
PCT Pub. Date: May 18, 2017

(65) Prior Publication Data
US 2018/0335543 A1    Nov. 22, 2018

Related U.S. Application Data

(60) Provisional application No. 62/254,541, filed on Nov. 12, 2015.

(51) Int. Cl.
*G01V 3/38* (2006.01)
*G01V 3/28* (2006.01)
(Continued)

(52) U.S. Cl.
CPC .............. *G01V 3/38* (2013.01); *G01V 3/18* (2013.01); *G01V 3/26* (2013.01); *G01V 3/28* (2013.01)

(58) Field of Classification Search
CPC ... G01V 3/38; G01V 3/18; G01V 3/26; G01V 3/28; G01V 3/10; G01V 3/20; G01V 3/24; G01V 3/30; G01V 3/34
See application file for complete search history.

(56) References Cited

U.S. PATENT DOCUMENTS 5,889,729 A * 3/1999 Frenkel .................... G01V 3/20
                                                                  367/73
9,448,324 B2   9/2016 Frey
(Continued)

FOREIGN PATENT DOCUMENTS

WO    WO 2014/003701    *  1/2014    .............. G01V 3/38
WO    WO2014011190 A1    1/2014
(Continued)

OTHER PUBLICATIONS

Yooyuanyong, S., "Mathematical model of MMR inversion for geophysical data", J. Sci. Technol., 2007.*
(Continued)

*Primary Examiner* — Kandasamy Thangavelu

(57) ABSTRACT

A two-step inversion method for computing multi-layer subterranean formation properties includes processing gain compensated electromagnetic measurement quantities using a first inversion to compute a corresponding set of borehole corrected gain compensated measurement quantities. The first inversion includes a mathematical model of the tool and the borehole in a uniform, anisotropic formation. The set of borehole corrected gain compensated measurement quantities are then processed using a second inversion to compute multi-layer anisotropic formation properties. The second inversion includes a 1D inversion employing a point dipole model and a multi-layer formation model.

20 Claims, 10 Drawing Sheets

(51) Int. Cl.
*G01V 3/18* (2006.01)
*G01V 3/26* (2006.01)

(56) References Cited

U.S. PATENT DOCUMENTS

| | | | |
|---|---|---|---|
| 9,541,666 B2 | 1/2017 | Frey | |
| 9,581,721 B2 | 2/2017 | Frey | |
| 9,784,880 B2 | 10/2017 | Frey | |
| 9,804,292 B2 | 10/2017 | Bertrand et al. | |
| 10,371,781 B2* | 8/2019 | Homan | G01V 3/28 |
| 10,416,336 B2* | 9/2019 | Li | G01V 3/34 |
| 2005/0049792 A1* | 3/2005 | Yu | G01V 3/28 |
| | | | 702/7 |
| 2010/0127708 A1 | 5/2010 | Bittar | |
| 2010/0283470 A1* | 11/2010 | Streinz | G01V 3/30 |
| | | | 324/338 |
| 2011/0074427 A1 | 3/2011 | Wang et al. | |
| 2011/0166842 A1 | 7/2011 | Banning-Geertsma et al. | |
| 2011/0238312 A1 | 9/2011 | Seydoux et al. | |
| 2013/0335092 A1* | 12/2013 | Wu | G01V 3/28 |
| | | | 324/333 |
| 2014/0191762 A1* | 7/2014 | Chen | G01V 3/24 |
| | | | 324/355 |
| 2015/0276973 A1 | 10/2015 | Frey | |
| 2015/0301222 A1 | 10/2015 | Davydychev et al. | |
| 2016/0047934 A1* | 2/2016 | Wang | G01V 3/10 |
| | | | 702/7 |
| 2016/0116627 A1* | 4/2016 | Frey | G01V 3/30 |
| | | | 324/338 |
| 2016/0146967 A1* | 5/2016 | Frey | G01V 3/26 |
| | | | 324/338 |
| 2017/0075024 A1* | 3/2017 | Wu | G01V 3/30 |

FOREIGN PATENT DOCUMENTS

| | | | | |
|---|---|---|---|---|
| WO | WO 2015/047256 | * | 4/2015 | ........... E21B 47/008 |
| WO | WO 2015/153279 | * | 10/2015 | ............... G01V 3/36 |
| WO | WO2017053072 A1 | | 3/2017 | |
| WO | WO2017078915 A1 | | 5/2017 | |
| WO | WO2017078916 A2 | | 5/2017 | |

OTHER PUBLICATIONS

International Search Report and Written Opinion issued in International Patent application PCT/US2016/056948, dated Jan. 24, 2017. 18 pages.
Wang et al., "Fast and Rigorous Inversion of Triaxial Induction Logging Data to Determine Formation Resistivity Anisotropy, Bed Boundary Position, Relative Dip and Azimuth Angles," Society of Exploration Geophysicists Expanded Abstracts 22, 514, 2003.
Wang et al., 2013, A fast extended 1D inversion for triaxial induction tools that allows for variable dip, SEG Technical Program Expanded Abstracts 2013, 538-544.
Moran et al., "Effects of formation anisotropy on resistivity-logging measurements" Geophysics, Jul. 1979, v. 44, p. 1266-1286.
Anderson, Barbara, Modeling and Inversion Methods for the Interpretation of Resistivity Logging Tool Response, Delft University Press, Oct. 15, 2001, p. 285-293.
Levenberg, Kenneth. "A Method for the Solution of Certain Problems in Least Squares.", Quarterly of Applied Mathematics. vol. 2, pp. 164-168, 1944.
Marquardt, Donald W., An Algorithm for Least-Squares Estimation of Nonlinear Parameters, Journal of the Society for Industrial and Applied Mathematics, vol. II, No. 2., pp. 431-441, 1963.
Björck, Ake. Numerical methods for least squares problems. Society for Industrial Applied Mathematics, Philadelphia, PA. pp. 339-358. 1996.

* cited by examiner

METHODS FOR INVERTING ELECTROMAGNETIC LOGGING MEASUREMENTS

CROSS REFERENCE TO RELATED APPLICATIONS

The present application is the U. S. national phase of International Patent Application No. PCT/US2016/056948, filed Oct. 14, 2016, and entitled "Methods for Inverting Electromagnetic Logging Measurements," which claims priority to U.S. Provisional Application 62/254,541 filed Nov. 12, 2015, the entirety of which is incorporated by reference.

FIELD OF THE INVENTION

Disclosed embodiments relate generally to downhole electromagnetic logging methods and more particularly to methods for inverting electromagnetic logging measurements using a layered formation model.

BACKGROUND INFORMATION

The use of electromagnetic measurements in prior art downhole applications, such as logging while drilling (LWD), is well known. Such techniques may be utilized to determine a subterranean formation resistivity, which, along with formation porosity measurements, is often used to indicate the presence of hydrocarbons in the formation.

In order to accurately measure formation properties, such as the vertical and horizontal formation resistivities, the electromagnetic logging measurements may need to be corrected for borehole effects. Such effects are related to the resistivity of the drilling fluid, the wellbore diameter, and the position of the logging tool in the wellbore. However, the position of the logging tool can vary rapidly during data acquisition owing to drill string vibration while drilling. The tool vibration dynamics are commonly rapid enough that the position of the tool in the wellbore varies significantly within the data acquisition time window. With such a data record, inverting for accurate borehole and formation properties is difficult (or even impossible).

Subterranean formations commonly include multiple layers (e.g., sedimentary layers) each having distinct electrical properties. Limited by computer processing speed, it is currently impractical (or impossible) to use a model including structural details of the logging tool and the borehole as well as including multiple formation layers having different electrical properties. There is a need for an improved inversion method that accounts for logging tool vibration and multi-layer subterranean formations.

SUMMARY

A method for computing multi-layer subterranean formation properties is disclosed. An electromagnetic logging while drilling tool acquires electromagnetic voltage measurements while rotating in a subterranean borehole. The voltage measurements are processed to compute a plurality of gain compensated measurement quantities which are further processed using a first inversion to compute a corresponding set of borehole corrected gain compensated measurement quantities. The first inversion includes a mathematical model of the tool and the borehole in a uniform, anisotropic formation. The set of borehole corrected gain compensated measurement quantities are then processed using a second inversion to compute multi-layer anisotropic formation properties. The second inversion includes a 1D inversion employing a point dipole model and a multi-layer formation model.

In one example embodiment, the borehole corrected gain compensated measurement quantities are computed via processing the electromagnetic voltage measurements using a first inversion to compute borehole and formation properties. The borehole and formation properties are further processed using the mathematical model to compute a first set of modeled gain compensated measurement quantities. The formation properties are further processed using a point dipole model to compute a second set of modeled gain compensated measurement quantities. The borehole effects may then be computed by processing differences between the first and second sets of modeled gain compensated measurement quantities. The borehole corrected gain compensated measurement quantities may be computed by subtracting the borehole effects from the gain compensated measurement quantities computed from the acquired voltage measurements.

The disclosed embodiments may provide various technical advantages. For example, the disclosed two-step inversion methodology enables multi-layer formation properties to be computed using the limitations of current computer processors (those of ordinary skill will readily appreciate that solving a single-step inversion including a multi-layer anisotropic formation as well physical details regarding the tool and borehole would be impractical or impossible due to the processing limitations of modern computers).

The disclosed embodiments may be further advantageous in that the borehole effects are removed using a point dipole model that essentially matches the 1D inversion model used compute the multi-layer formation properties. Such "matching" of the point dipole models tends to improve accuracy and reliability of the computed multi-layer formation properties. Certain disclosed embodiments further make use of gain compensated measurement quantities thereby eliminating errors due to drift of the gains in downhole environment and also eliminating expensive (and cumbersome) procedures to account for the gains.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
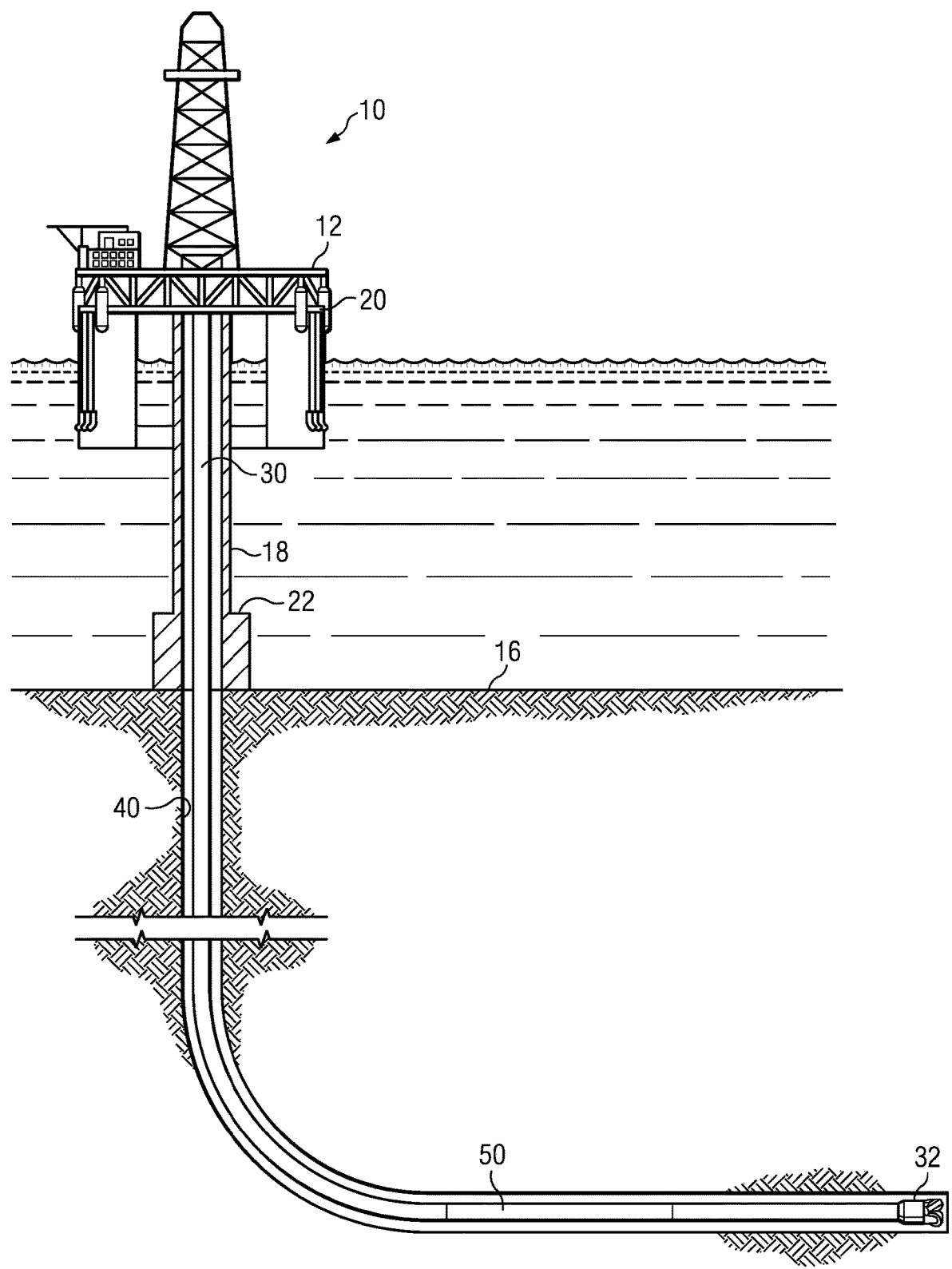
FIG. 1 depicts one example of a drilling rig on which the disclosed electromagnetic logging methods may be utilized.

FIG. 1 depicts an example drilling rig 10 suitable for employing various method embodiments disclosed herein. A semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering a drill string 30, which, as shown, extends into borehole 40 and includes a drill bit 32 deployed at the lower end of a bottom hole assembly (BHA) that further includes an electromagnetic measurement tool 50 configured to make directional electromagnetic logging measurements. As described in more detail below the electromagnetic measurement tool 50 may include multi-axial antennas deployed on a logging while drilling tool body.

It will be understood that the deployment illustrated on FIG. 1 is merely an example. Drill string 30 may include substantially any suitable downhole tool components, for example, including a steering tool such as a rotary steerable tool, a downhole telemetry system, and one or more MWD or LWD tools including various sensors for sensing downhole characteristics of the borehole and the surrounding formation. The disclosed embodiments are by no means limited to any particular drill string configuration.

It will be further understood that the disclosed embodiments are not limited to use with a semisubmersible platform 12 as illustrated on FIG. 1. The disclosed embodiments are equally well suited for use with either onshore or offshore subterranean operations.

Figure 2A:
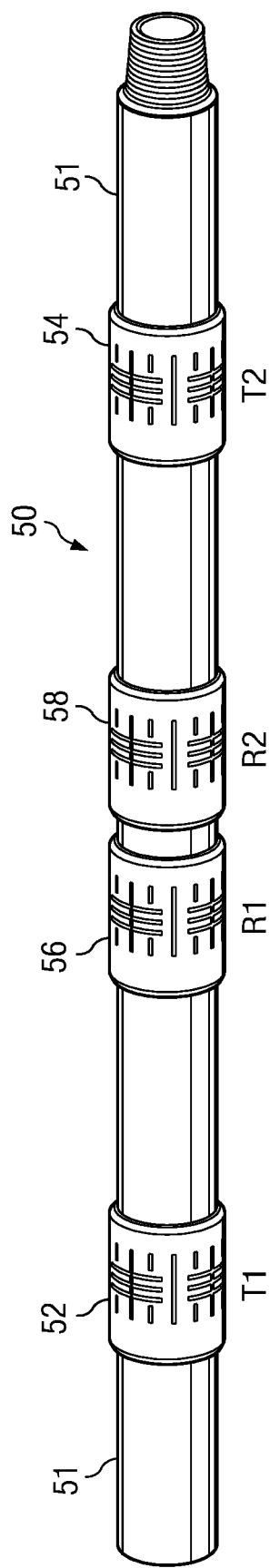
FIG. 2A depicts one example of the electromagnetic logging tool shown on FIG. 1.

FIG. 2A depicts one example of an electromagnetic measurement tool 50. In the depicted embodiment measurement tool 50 includes first and second axially spaced transmitters 52 and 54 and first and second axially spaced receivers 56 and 58 deployed on a logging while drilling tool body 51, with the receivers 56 and 58 being deployed axially between the transmitters 52 and 54. To obtain directional measurements, each of the transmitters 52 and 54 and receivers 56 and 58 generally includes at least one transverse antenna and may further include an axial antenna. For example, the transmitters and receivers may include a bi-axial antenna arrangement including an axial antenna and a transverse (cross-axial) antenna. In another embodiment, the transmitters and receivers may include a tri-axial antenna arrangement including an axial antenna and first and second transverse antennas that are orthogonal to one another. As is known to those of ordinary skill in the art, an axial antenna is one whose moment is substantially parallel with the longitudinal axis of the tool. Axial antennas are commonly wound about the circumference of the logging tool such that the plane of the antenna is substantially orthogonal to the tool axis. A transverse antenna is one whose moment is substantially perpendicular to the longitudinal axis of the tool. A transverse antenna may include, for example, a saddle coil (e.g., as disclosed in U.S. Patent Publications 2011/0074427 and 2011/0238312 each of which is incorporated by reference herein).

Figure 2B:
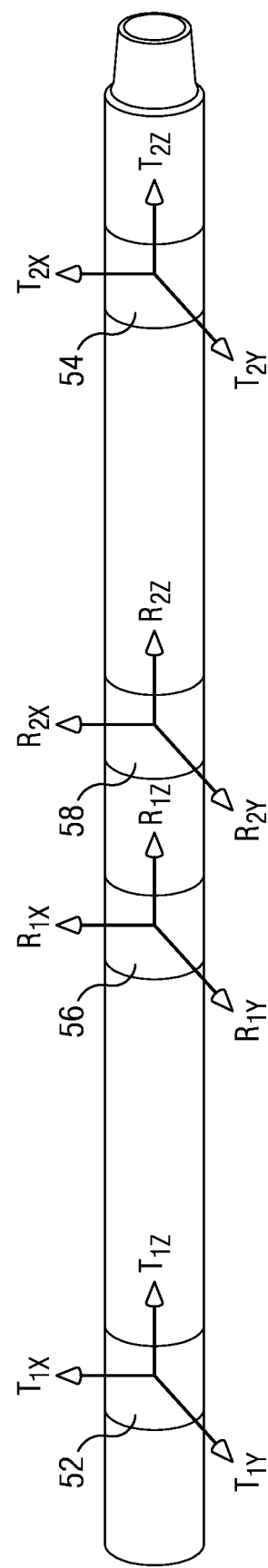
FIG. 2B schematically depicts the antenna moments in an electromagnetic logging tool including triaxial transmitters and receivers.
Figure 2C:
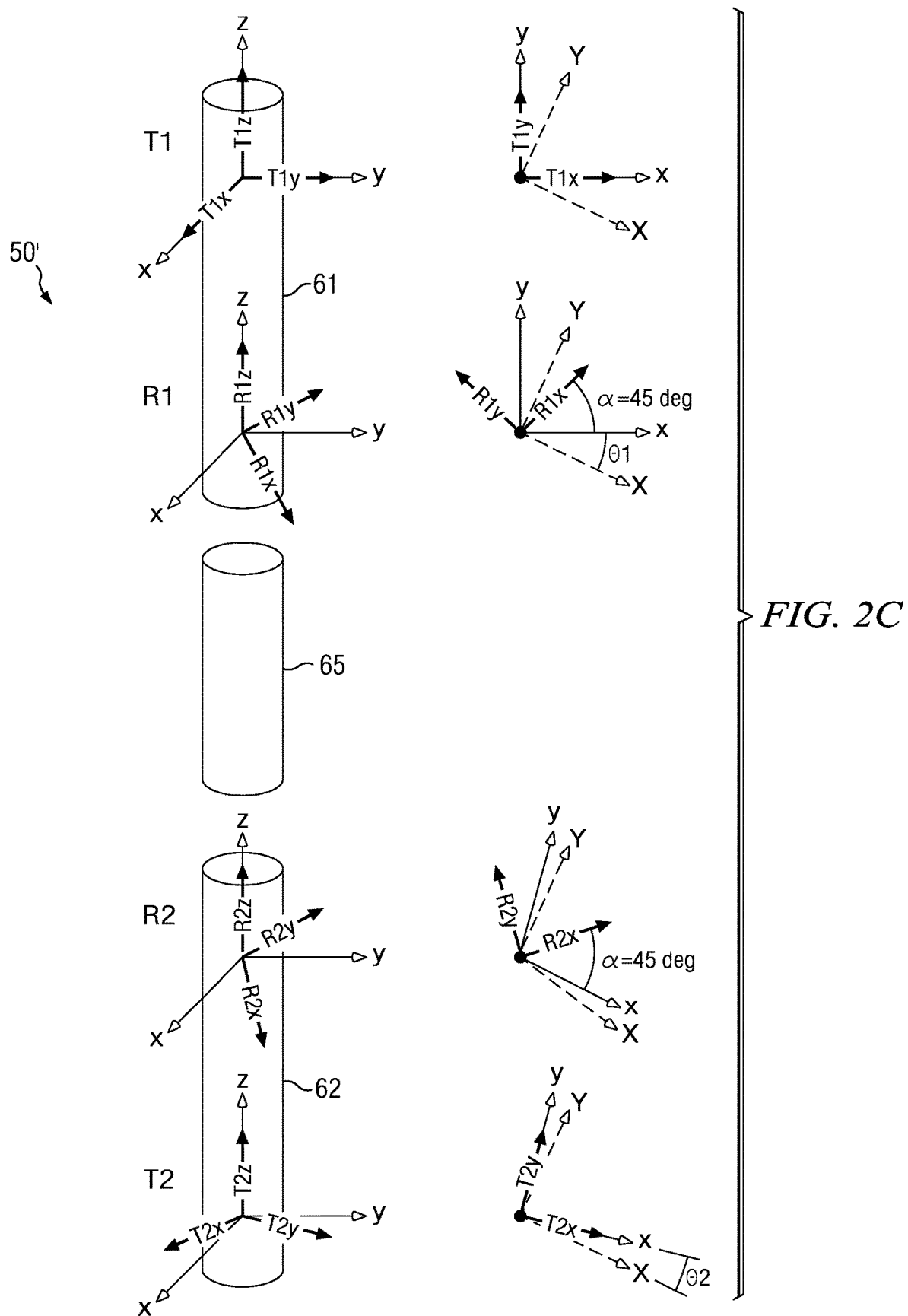
FIG. 2C schematically depicts the antenna moments in an alternative electromagnetic logging tool including triaxial transmitters and receivers.

While not depicted on FIGS. 2A-2C, it will be understood that one or more of the transmitters 52 and 54 and the receivers 56 and 58 may include a tilted antenna. Tilted antennas are commonly used to make directional resistivity measurements. As is known to those of ordinary skill in the art, a tilted antenna is one whose moment is angularly offset (tilted) with respect to the tool axis and is neither parallel with nor orthogonal to the tool axis.

FIG. 2B depicts the moments (magnetic dipoles) of one embodiment of measurement tool 50 in which the transmitters 52, 54 and receivers 56, 58 each include a tri-axial antenna arrangement. Each of the transmitters 52, 54 includes an axial transmitting antenna $T1_z$ and $T2_z$ and first and second transverse transmitting antennas $T1_x$, $T1_y$ and $T2_x$, $T2_y$. Likewise, each of the receivers 56, 58 includes an axial receiving antenna $R1_z$ and $R2_z$ and first and second transverse receiving antennas $R1_x$, $R1_y$ and $R2_x$, $R2_y$. It will be understood that the disclosed embodiments are not limited to a tri-axial antenna configuration such as that depicted on FIG. 2B.

FIG. 2C depicts an alternative electromagnetic measurement tool embodiment 50' in which the first and second transmitters are deployed on corresponding first and second subs 61 and 62 that are free to rotate with respect to one another (e.g., in an embodiment in which a drilling motor 65 is deployed therebetween). As in tool embodiment 50, each of the transmitters T1 and T2 and receivers R1 and R1 may include a tri-axial antenna arrangement. In the example embodiment depicted the moment of $R1_z$ is aligned with the moment of $T1_z$ (and the z-axis) while the moments of $R1_x$ and $R1_y$ are rotationally offset from the moments of $T1_x$ and $T1_y$ by an offset angle α (e.g., 45 degrees in the depicted embodiment). The moment of $R2_z$ is aligned with the moment of $T2_z$ while the moments of $R2_x$ and $R2_y$ are rotationally offset from the moments of $T2_x$ and $T2_y$ by a (e.g., 45 degrees). The disclosed embodiments are, of course, not limited in these regards.

As stated above, the first and second subs 61 and 62 may rotate with respect to one another such that the moments of the x- and y-axis transmitting and receiving antennas are misaligned and rotate with respect to one another (i.e., the misalignment angle between the subs varies with time). Using the notation shown on FIG. 2C, at any instant in time, the orientation angle of the x-axis on sub 61 (the $T1_x$ direction) is $\theta_1$ with respect to an arbitrary 'global' (or wellbore) x-direction. Likewise, at the same instant in time, the orientation angle of the x-axis on sub 62 (the $T2_x$ direction) is $\theta_2$ with respect to the global x-direction. It will thus be understood that the moments of the x- and y-transmitting and receiving antennas T1 and T2 and R1 and R2 are misaligned by a misalignment angle $\gamma = \theta_1 \theta_2$. It will be understood that $\theta_1$ and $\theta_2$ may be referred to as toolface angles of the first and second subs in that they define the rotational orientation of the subs with respect to a global reference direction. Since $\theta_1$ and $\theta_2$ are variable with time (owing to the rotation of the subs) and since the subs rotate at different rates the misalignment angle γ also varies with time.

Figure 3A:
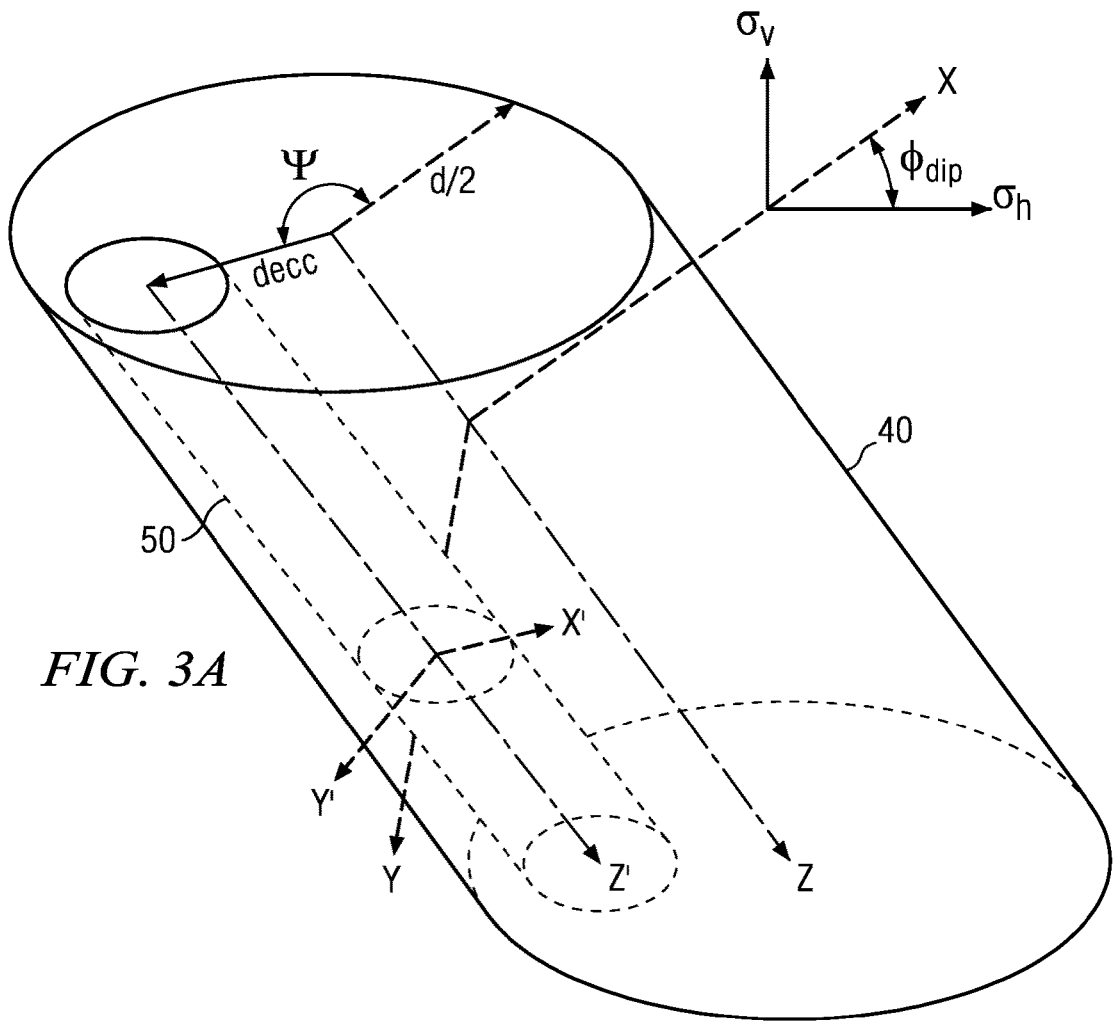
FIGS. 3A and 3B (collectively FIG. 3) depict a schematic illustration of a decentered tool in a wellbore that penetrates an anisotropic formation at a relative dip angle.
Figure 3B:
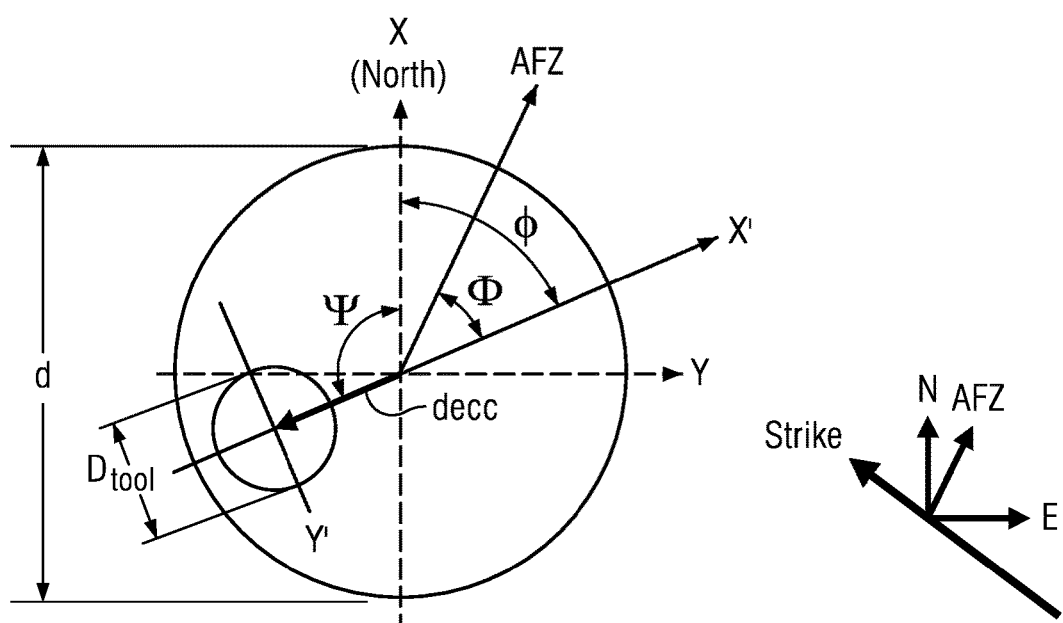

FIG. 3 depicts a schematic illustration of a decentered (eccentered) electromagnetic logging tool 50 deployed in a wellbore 40 that penetrates an anisotropic formation at a relative dip angle is shown. A wellbore reference frame may be defined by x-, y-, and z-axes (which are fixed relative to the wellbore). A tool reference frame may be defined by x'-, y'-, and z'-axes which are fixed relative to the logging tool. Rotation of the tool in the wellbore causes the x'- and y'-tool axes rotate about the z- and z'-axes with respect to the x- and y-axes of the wellbore. The relative angle θ between the reference frames (e.g., between the x- and x'-axes in the plane orthogonal to the z-axis) is commonly referred to in the art as the toolface angle.

The tool 50 is shown to be decentered in the wellbore 40 (having a wellbore diameter d) by a decentering distance $d_{ecc}$ at a decentering azimuthal angle ψ (in the wellbore reference frame). An apparent decentering azimuth (also referred to as the apparent tool decentering angle AZT) may be defined as the direction of tool decentering in the tool reference frame (e.g., with respect to the x'-axis). The formation is depicted to be anisotropic, having vertical and horizontal conductivities σv and σh at a relative dip angle $\phi_{dip}$ with respect to the x-axis (i.e., with respect to the wellbore reference frame). An apparent dip azimuth angle is indicated by Φ and represents the relative angle between an orientation marker on the tool (e.g., the x'-axis on the tool which is aligned with the magnetic dipole on the x-axis transmitter) and the direction of the formation's normal vector on the plane orthogonal to the tool's z'-axis. The apparent dip azimuth angle is also referred to herein as the apparent formation azimuth AZF. The conductivity of the drilling fluid is also indicated by σmud.

Figure 4:
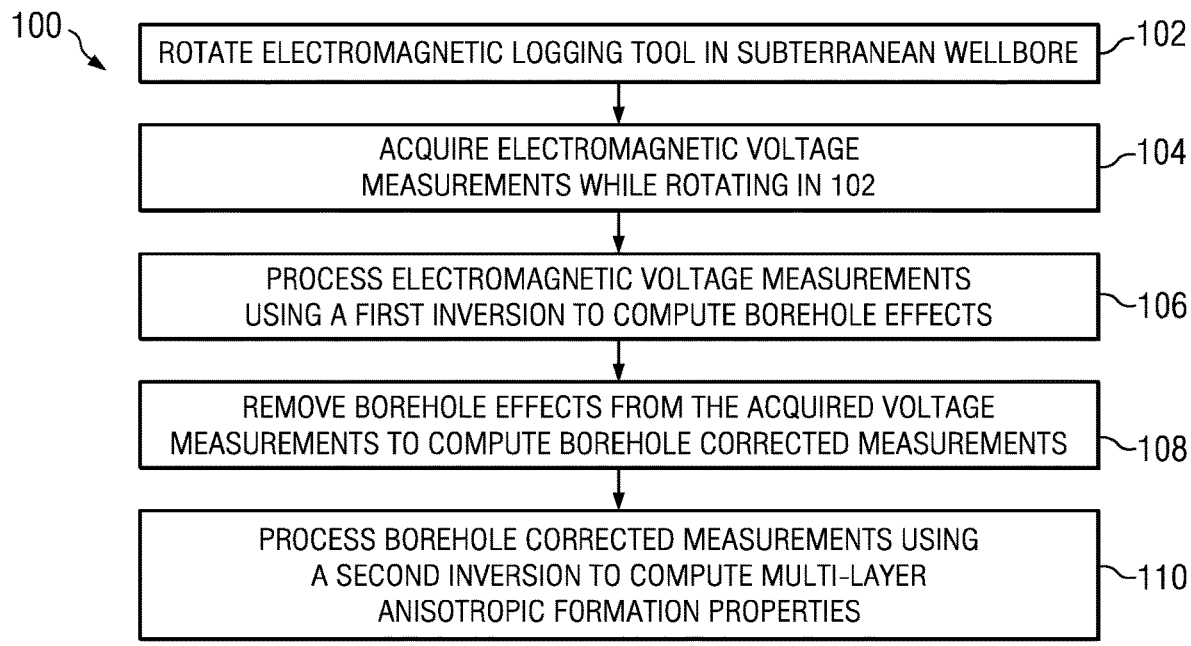
FIG. 4 depicts a flow chart of one disclosed method embodiment for computing multi-layer formation properties from electromagnetic logging while drilling data.

FIG. 4 depicts a flow chart of one disclosed method embodiment 100 for computing multi-layer formation properties from electromagnetic logging while drilling measurements. An electromagnetic measurement tool (e.g., one of the measurement tools depicted on FIGS. 2B and 2C) is deployed in and rotated in a subterranean wellbore at 102 (e.g., while drilling the wellbore). Electromagnetic measurements are acquired at 104 (e.g., via firing the transmitters and receiving the corresponding electromagnetic waves at the receiving antennas) while the tool is rotating. The electromagnetic measurements are processed at 106 using a first inversion to compute borehole effects (e.g., the effect of the logging tool and the wellbore on the measurements). The borehole effects computed in 106 are then removed from the electromagnetic measurements acquired at 104 (e.g., via subtraction) to compute borehole corrected measurements at 108. The borehole corrected measurements are then processed with a second inversion at 110 to compute multi-layer anisotropic formation properties.

With continued reference to FIG. 3, and as known to those of ordinary skill in the art, a time varying electric current (an alternating current) in a transmitting antenna produces a corresponding time varying magnetic field in the local environment (e.g., the tool collar and the formation). The magnetic field in turn induces electrical currents (eddy currents) in the conductive formation. These eddy currents further produce secondary magnetic fields which may produce a voltage response in a receiving antenna (these voltage responses are referred to herein as $V_{ijkl}$ where i and j represent the transmitter and receiver station and k and l represent the axial orientation of the transmitter and receiver moments).

An electromagnetic logging tool including triaxial transmitters and triaxial receivers (e.g., as depicted on FIGS. 2B and 2C) can obtain a complete set of trans-impedance coupling voltages $V_{ijkl}$ using six antenna firing sub cycles. An example firing sequence for a tool having two transmitter and two receiver stations (i, j=1, 2) is shown below in Table 1.

| Transmitter Firing | Received Voltage Signals |
|---|---|
| T1x | $V_{11xx}, V_{11xy}, V_{11xz}, V_{12xx}, V_{12xy}, V_{12xz}$ |
| T1y | $V_{11yx}, V_{11yy}, V_{11yz}, V_{12yx}, V_{12yy}, V_{12yz}$ |
| T1z | $V_{11zx}, V_{11zy}, V_{11zz}, V_{12zx}, V_{12zy}, V_{12zz}$ |
| T2x | $V_{21xx}, V_{21xy}, V_{21xz}, V_{22xx}, V_{22xy}, V_{22xz}$ |
| T2y | $V_{21yx}, V_{21yy}, V_{21yz}, V_{22yx}, V_{22yy}, V_{22yz}$ |
| T2z | $V_{21zx}, V_{21zy}, V_{21zz}, V_{22zx}, V_{22zy}, V_{22zz}$ |

The transmitting antennas (T1x, T1y, T1z, T2x, T2y, and T2z) may be fired sequentially with each of the six receiving antenna simultaneously measuring a corresponding voltage response (listed in Table 1). In one example embodiment, each transmitter firing is 4 millisecond (0.004 second) followed by a 16 millisecond quiet time for a firing sub-cycle interval of 20 milliseconds. In this example it takes 120 milliseconds (6×20) to acquire a complete set of trans-impedance coupling voltages $V_{ijkl}$ (36 voltage measurements in total as indicated in the table).

One can acquire substantially any suitable number N of sets of the complete 9-component trans-impedance coupling voltages $V_{ijkl}$ by repeating the firing sequence N times. It will be understood that using a larger number N of measurement sets tends to give more accurate results with a lower standard deviation due to the random motion of the tool in the borehole, however, a larger number N requires a longer data acquisition time. A maximum value for N can be computed, for example, based on a given drilling speed and a given depth sampling interval. For example only, a hypothetical drilling speed one 100 feet per hour and a six inch depth interval yields 18 seconds (3600/200) for data acquisition per depth interval. Assuming that it takes 120 milliseconds to acquire a single set of trans-impedance voltages yields a maximum value of N=150 (in this example).

Since the logging tool is generally rotating during data acquisition (e.g., at 120 rpm), the toolface angle θ varies with each firing sub-cycle. The toolface angle θ may therefore be measured at each sub-cycle (i.e., with each transmitter antenna firing). The multiple sets of voltage measurements may be referred to herein as $V_{ijkl}m$, m=1, 2, . . . , N and acquired at corresponding toolface angles $\theta_{ijklm}$. Note that subsets of the coupling voltages have the same toolface angle. For example, $V_{11xxm}, V_{11xym}, V_{11xzm}, V_{12xxm}, V_{12xym}$, and $V_{12xzm}$ are acquired simultaneously while firing the T1x transmitter such that $\theta_{11xxm}, \theta_{11xym}, \theta_{11xzm}, \theta_{12xxm}, \theta_{12xym}$, and $\theta_{12xzm}$ have the same value (are equal to one another).

In general, the receiving antenna voltages are measured while the tool rotates in the borehole. The measured voltages may be expressed mathematically in terms of their harmonic voltage coefficients, for example, as follows thereby enabling the harmonic voltage coefficients to be obtained:

$$V_{ijkl} = V_{DC\_ijkl} + V_{FHC\_ijkl}\cos(\theta) + V_{FHS\_ijkl}\sin(\theta) + V_{SHC\_ijkl}\cos(2\theta) + V_{SHS\_ijkl}\sin(2\theta) \quad (1)$$

where $V_{DC\_ijkl}$ represents a DC voltage coefficient, $V_{FHC\_ijkl}$ and $V_{FHS\_ijkl}$ represent first order harmonic cosine and first order harmonic sine voltage coefficients (also referred to herein as first harmonic cosine and first harmonic sine voltage coefficients), and $V_{SHC\_ijkl}$ and $V_{SHS\_ijkl}$ represent second order harmonic cosine and second order harmonic sine voltage coefficients (also referred to herein as second harmonic cosine and second harmonic sine voltage coefficients) of the ij transmitter receiver couplings.

The coefficients in Equation 1 can be obtained using a least square curve fitting algorithm from a collection of voltage tool data points $VT_{ijklm}$ m=1, 2, . . . N, sampled randomly at $\theta_{ijklm}$ (where VT indicates voltages measured at the tool as opposed to modeled or otherwise computed). This least square fitting process offers an advantage of ensample averaging over the collection of data records used in the fitting to reduce the effect of random tool motion during data acquisition and intrinsic instrumentation random noise.

One example of a least square algorithm to obtain the coefficients is as follows: The array of harmonic voltage coefficients $C_{ijkl}$ (where $C_{ijkl}=[V_{DC\_ijkl}, V_{FHC\_ijkl}, V_{FHS\_ijkl}, V_{SHC\_ijkl}, V_{SHS\_ijkl}]$) includes the five coefficients defined in Equation 1. A voltage array $Z_m = Z(\theta_m, C_{ijkl})$, which is a function of the toolface angle and the coefficient array, represents the measured sets of trans-impedance coupling voltages $V_{ijklm}$ described above. Taking the derivative of $Z(\theta_m, C_{ijkl})$ with respect to $C_{ijkl}$ yields the following Gramian matrix:

$$\Gamma_{nm} = \frac{\partial Z(\theta_m, C_{ijkl})}{\partial C_{ijkl}(n)} = f_n(\theta_m)$$

where:

$$Y = [Z_1, \ldots Z_N]^T$$

$$Z_m = Z(\theta_m, C_{ijkl}) = \sum_{n=1}^{5} C_{ijkl}(n) f_n(\theta_m), m = 1, 2, \ldots, N$$

$$C_{ijkl} = [V_{DC\_ijkl}, C_{FHC\_ijkl}, V_{FHS\_ijkl}, V_{SHC\_ijkl}, V_{SHS\_ijkl}]^T$$

$$f = [1, \cos(\theta), \sin(\theta)\cos(2\theta), \sin(2\theta)]$$

The least square solution for the coefficient $C_{ijkl}$ may then be given in matrix notation as follows:

$$C_{ijkl} = (\Gamma\Gamma^T)^{-1}\Gamma Y$$

Co-pending, commonly assigned, and commonly invented U.S. Provisional Patent Application No. 62/222,452, which is incorporated by reference herein in its entirety, discloses a method for computing the mean position of an electromagnetic logging tool in a wellbore undergoing lateral vibrations. The '452 application further demonstrates that the five harmonic voltage coefficients computed above in $C_{ijkl}$ closely match the coefficients that may be obtained with the tool is stationary and located at the mean position. The methods disclosed in the '452 application thus effectively overcome the difficulty of dealing with a tool having a changing and unknown position in the wellbore by solving for the mean tool position and then inverting for formation properties using a model in which the tool is located at the mean position.

Upon obtaining the harmonic voltage coefficients, ratios of the DC xx and yy voltage measurements or the second harmonic xx and yy voltage measurements may optionally be computed and allow a gain ratio of the x to y transmitter and gain ratio of the x to y receiver to be obtained. The voltage measurements may also be rotated mathematically to simulate rotation of the x and y antennas in the R1 and R2 receivers and the T2 transmitter such that they are rotationally aligned with the x and y antennas in the T1 transmitter. Such rotation removes the effect of the offset angle α and misalignment angle γ on the measurements. Such computations are disclosed, for example, in U.S. patent application Ser. No. 14/549,396 which is incorporated by reference herein in its entirety.

The harmonic voltage coefficients may be further processed to compute the following quantities that have similar gain components (and that may be subsequently factored out):

$$xxpyy_{ij} = V_{DCijxx} + V_{DCijyy} \quad (2)$$

$$xxmyy_{ij} = 0.5 \times (V_{SHCijxx} V_{SHCijxy} V_{SHSijyx} V_{SHSijxy}) \quad (3)$$

$$xymyx_{ij} = V_{DCijxy} V_{DCijyx} \quad (4)$$

$$xypyx_{ij} = 0.5 \times (V_{SHCijxy} + V_{SHCijyx} + V_{SHSijxx} V_{SHSijyy}) \quad (5)$$

$$\overline{V}_{ijxx} = 0.5 \times (xxpyy_{ij} + xxmyy_{ij}) \quad (6)$$

$$\overline{V}_{ijyy} = 0.5 \times (xxpyy_{ij} xxmyy_{ij}) \quad (7)$$

$$\overline{V}_{ijxy} = 0.5 \times (xypyx_{ij} + xymyx_{ij}) \quad (8)$$

$$\overline{V}_{ijyx} = 0.5 \times (xypyx_{ij} xymyx_{ij}) \quad (9)$$

$$\overline{V}_{ijxz} = 0.5 \times (V_{FHCijxz} V_{FHSijyz}) \quad (10)$$

$$\overline{V}_{ijzx} = 0.5 \times (V_{FHCijzx} V_{FHSijzy}) \quad (11)$$

$$\overline{V}_{ijyz} = 0.5 \times (V_{FHCijyz} + V_{FHSijxz}) \quad (12)$$

$$\overline{V}_{ijzy} = 0.5 \times (V_{FHCijzy} + V_{FHSijzx}) \quad (13)$$

$$\overline{V}_{ijzz} = V_{DCijzz} \quad (14)$$

where the $\overline{V}_{ijkl}$ quantities in Equations 6-14 are computed from the harmonic voltage coefficients and may be related to trans-impedance coupling voltages $VT_{ijkl}$ measured by a stationary tool located at the above described mean position in the borehole.

The quantities in Equations 6-14 contain only x and z transmitter and receiver gains. These gains may be canceled out via computing various ones of the following ratios. For example, the following term by term (TBT) compensation operators may be defined for any measurement X obtained between transmitter i and receiver j, for example, as follows:

$$TBT(X) = \sqrt{\frac{X_{ij}}{X_{ii}} \times \frac{X_{ji}}{X_{jj}}} \quad (15)$$

where $X_{ij}$, $X_{ji}$, $X_{ii}$, and $X_{jj}$ may include the measurement terms defined above with respect to Equations 6-14 obtained using the i and j transmitter and receiver (e.g., the transmitters and receivers depicted on FIGS. 2A, 2B, and 2C).

Various gain compensated quantities may be computed following the form of Equation 15. For example, using the TBT operator in Equation 15:

$$C\overline{V}_{kl} = TBT(\overline{V}_{ijkl}) = \sqrt{\frac{\overline{V}_{12kl}}{\overline{V}_{11kl}} \times \frac{\overline{V}_{21kl}}{\overline{V}_{22kl}}} \quad (16)$$

$$CR\overline{V}_{kl} = TBT(\text{real}(\overline{V}_{ijkl}))$$

$$CI\overline{V}_{kl} = TBT(\text{imag}(\overline{V}_{ijkl}))$$

$$CA\overline{V}_{kl} = TBT(\text{abs}(\overline{V}_{ijkl}))$$

$$CP\overline{V}_{kl} = TBT(p\text{ase}(\overline{V}_{ijkl}))$$

where $C\nabla_{kl}$ is a complex compensated quantity and $CR\nabla_{kl}$, $CI\nabla_{kl}$, $CA\nabla_{kl}$, and $CP\nabla_{kl}$ are real compensated quantities. The operators real(•), imag(•), abs(•), and p ase(•) return the real component, the imaginary component, the absolute value, and the phase angle of the complex quantity $\nabla_{ijkl}$.

As disclosed in more detail in U.S. Provisional Patent Application Ser. No. 62/250,651, which is incorporated by reference herein in its entirety, many of the $C\nabla_{kl}$ quantities are azimuthally invariant (e.g., invariant with respect to the formation dip azimuth and/or the decentering azimuth). For example, for a tool having a centered mean position, the off diagonal terms of $C\nabla_{kl}$, namely $C\nabla_{xz}$, $C\nabla_{zx}$, $C\nabla_{yz}$, $C\nabla_{zy}$, $C\nabla_{xy}$, and $C\nabla_{yx}$, are azimuthally invariant. The following quantities are also azimuthally invariant for a tool having a centered mean position:

$$CXXPYY = TBT(xxpyy_{ij}) = \sqrt{\frac{xxpyy_{ij}}{xxpyy_{ii}} \times \frac{xxpyy_{ji}}{xxpyy_{jj}}} \quad (17)$$

$$CXXMYY = TBT(xxmyy_{ij}) = \sqrt{\frac{xxmyy_{ij}}{xxmyy_{ii}} \times \frac{xxmyy_{ji}}{xxmyy_{jj}}}$$

where CXXPYY represents a complex measurement quantity related to an xx plus yy coupling component and CXXMYY represents a complex measurement quantity related to an xx minus yy coupling component.

The following measurement quantities are also azimuthally invariant when the mean tool position is off center (decentered):

$CRXXPYY=\text{TBT}(\text{real}(xxpyy_{ij}))$ $CIXXPYY=\text{TBT}(\text{imag}(xxpyy_{ij}))$ $CRXYMYX=\text{TBT}(\text{real}(xymyx_{ij}))$ $CIXYMYX=\text{TBT}(\text{imag}(xymyx_{ij}))$ $CRZ=\text{TBT}(\text{real}(\overline{\nabla}_{ijzz}))$ (18)

where CRXXPYY and CIXXPYY represent real and imaginary gain compensated quantities related to the xx plus yy coupling, CRXYMYX and CIXYMYX represent real and imaginary gain compensated quantities related to the xy minus yx coupling, and CRZ represents a real gain compensated quantity related to the zz coupling.

Gain compensated quantities that preserve the azimuthal properties may also be computed as disclosed in co-pending, commonly assigned U.S. patent application Ser. No. 14/853,322, which is incorporated by reference herein in its entirety. The following gain compensated quantities preserve the azimuthal properties of the original voltage measurements:

$$CZX = \sqrt{\frac{V_{FHC\_ijzx} \cdot V_{FHC\_jixz}}{V_{DC\_jjxx} \cdot V_{DC\_iizz}}} = \sqrt{\frac{V_{FHS\_ijzy} \cdot V_{FHS\_jiyz}}{V_{DC\_jjyy} \cdot V_{DC\_iizz}}} \quad (19)$$

$$CZY = \sqrt{\frac{V_{FHC\_ijzx} \cdot V_{FHC\_jixz}}{V_{DC\_jjxx} \cdot V_{DC\_iizz}}} = \sqrt{\frac{V_{FHS\_ijzy} \cdot V_{FHS\_jiyz}}{V_{DC\_jjyy} \cdot V_{DC\_iizz}}}$$

$$CXZ = \sqrt{\frac{V_{FHC\_ijzx} \cdot V_{FHC\_jixz}}{V_{DC\_jjxx} \cdot V_{DC\_iizz}}} = \sqrt{\frac{V_{FHS\_ijzy} \cdot V_{FHS\_jiyz}}{V_{DC\_jjyy} \cdot V_{DC\_iizz}}}$$

-continued $$CYZ = \sqrt{\frac{V_{FHC\_ijzx} \cdot V_{FHC\_jixz}}{V_{DC\_jjxx} \cdot V_{DC\_iizz}}} = \sqrt{\frac{V_{FHS\_ijzy} \cdot V_{FHS\_jiyz}}{V_{DC\_jjyy} \cdot V_{DC\_iizz}}}$$

where CZX, CZY, CXZ, and CYZ represent gain compensated quantities that have the characteristics of zx, zy, xz, and yz tensor couplings. These quantities may be further combined to compute gain compensated symmetrized (SX and SY) and anti-symmetrized measurement quantities (AX and AY), as follows:

$SX=CZXCXZ$ $AX=CZX+CXZ$ $SY=CZYCYZ$ $AY=CZY+CYZ$ (20)

It will be understood that the disclosed embodiments are not limited to using the above defined gain compensated measurement quantities. Other suitable gain compensated measurement quantities are disclosed in commonly assigned, co-pending U.S. patent application Ser. Nos. 14/285,581; 14/285,588; 14/339,959; 14/325,797; 14/549,396; and U.S. Provisional Patent Application Ser. No. 62/250,662, each of which is incorporated by reference herein in its entirety.

Figure 5:
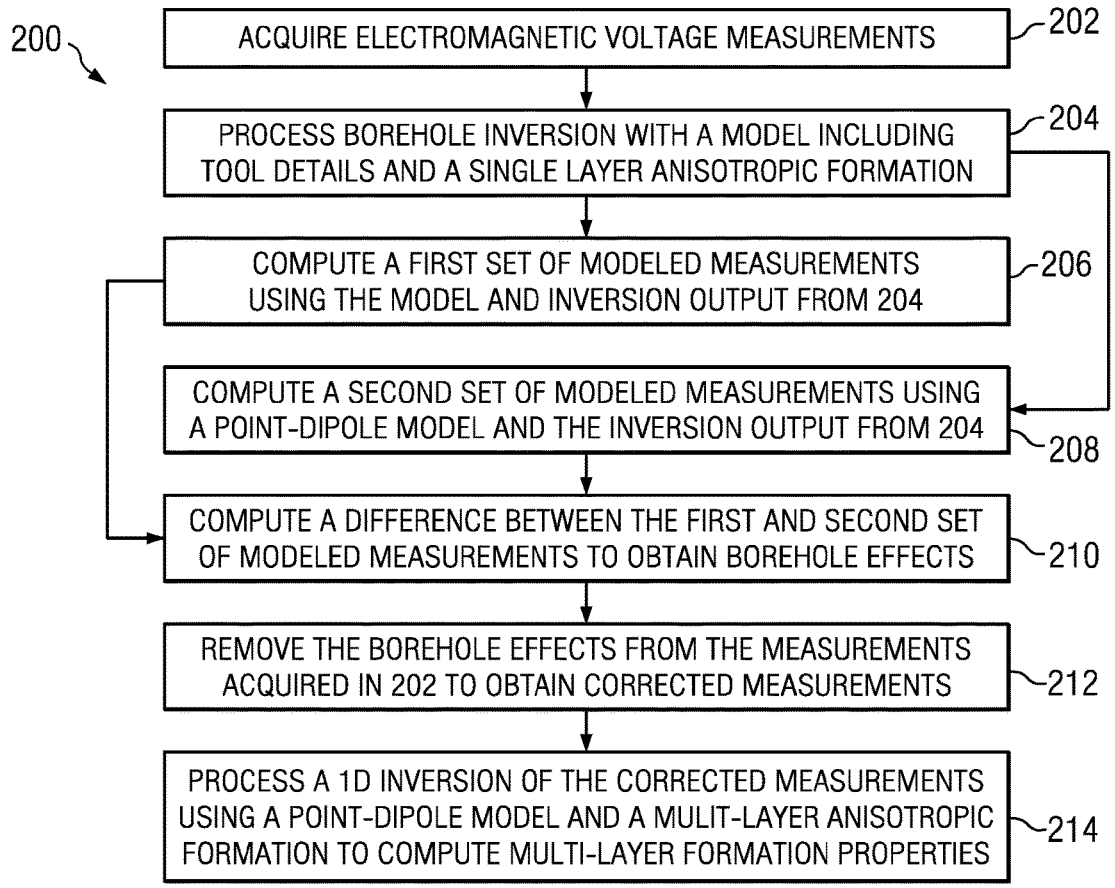
FIG. 5 depicts a flow chart of another disclosed method embodiment for computing multi-layer formation properties from electromagnetic logging while drilling data.

FIG. 5 depicts a flow chart of another disclosed method embodiment 200 for computing multi-layer formation properties from electromagnetic logging while drilling data. Electromagnetic voltage measurements are acquired at 202 (e.g., while rotating an electromagnetic logging while drilling tool in a wellbore). The measurements are processed at 204 using a first inversion in which the inversion model includes tool details and a uniform (single layer) anisotropic formation to output various formation properties, for example, including horizontal and vertical resistivities, a dip angle, a formation dip azimuth, and various wellbore properties, for example, including a mean decentering distance and a mean decentering azimuth of the tool in the wellbore, a resistivity of the drilling fluid, and the hole diameter. A first set of modeled measurements (e.g., modeled voltage measurements) is computed at 206 using the model (including the tool with finite size antenna coil and conducting mandrel in a borehole through an anisotropic formation) and the inversion output from 204. A second set of modeled measurements (e.g., modeled voltage measurements) is computed at 208 using a point dipole model and the inversion output from 204. Differences between the first and second sets of modeled measurements are computed at 210 to obtain the effects of the borehole (the borehole effects) on the measurements. These borehole effects are subtracted from the acquired measurements at 212 to obtain borehole corrected measurements. The borehole corrected measurements are then processed using a 1D inversion that includes a point dipole model and a multi-layer anisotropic formation to compute the multi-layer formation properties (e.g., the vertical and horizontal resistivities and a thickness of each of the multiple layers).

Figure 6:
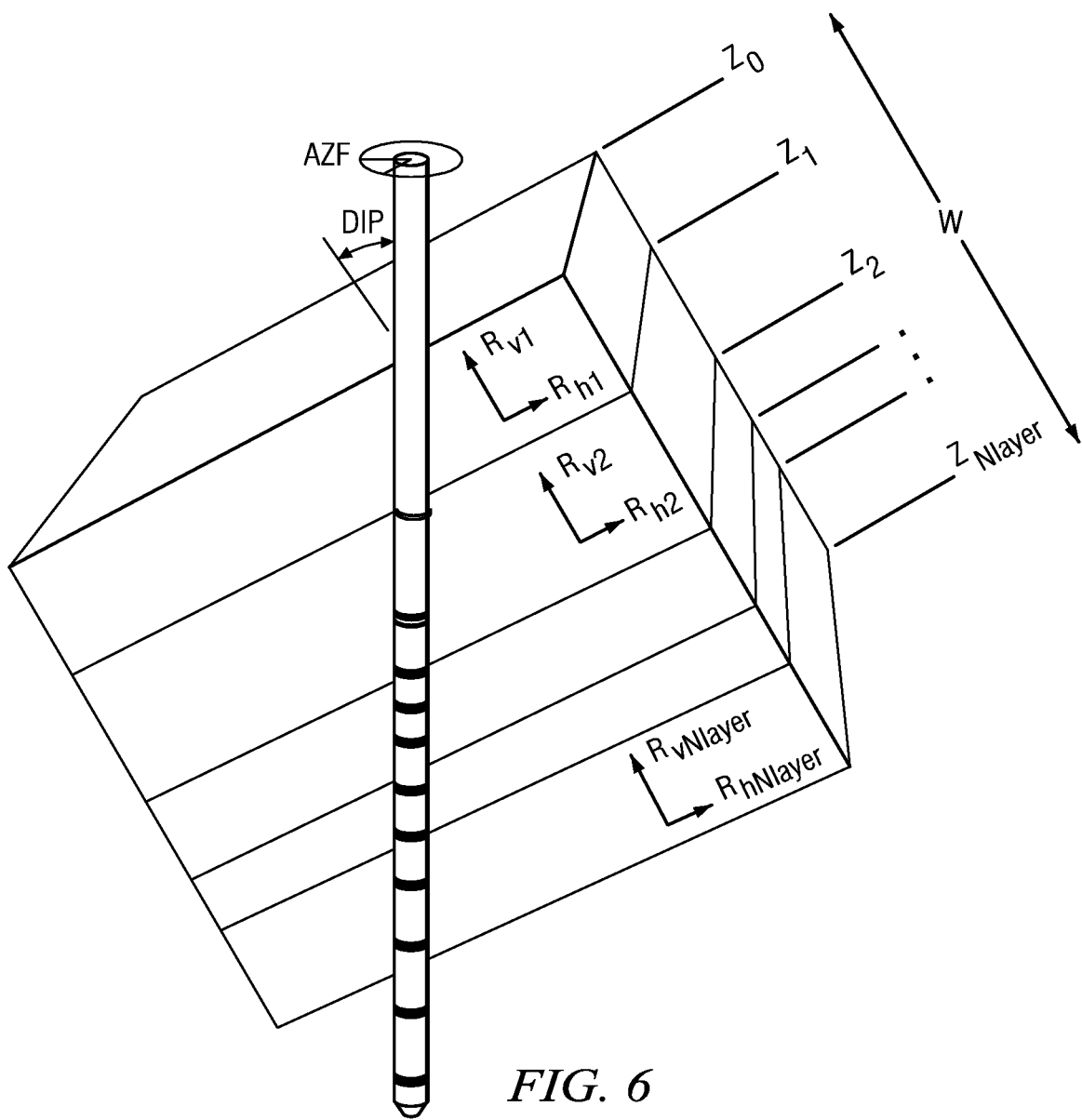
FIG. 6 depicts a graphical representation of a suitable 1D inversion model for use in the flow chart shown on FIG. 5 and the block diagram shown on FIG. 7.
Figure 7:
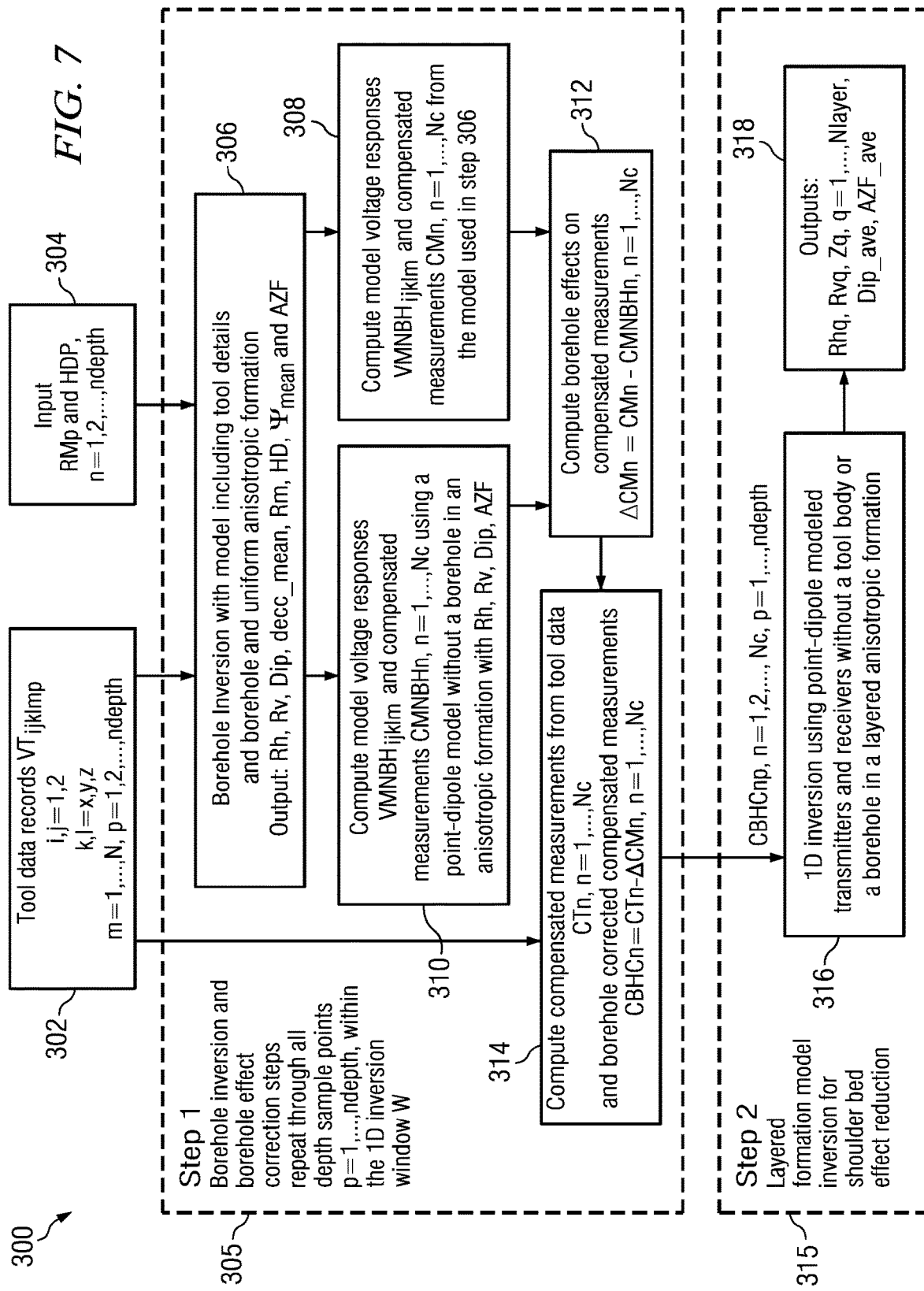
FIG. 7 depicts a block diagram of another disclosed method embodiment for inverting electromagnetic logging while drilling data to compute multi-layer formation properties.

FIG. 6 depicts a graphical representation of a suitable 1D inversion model for use in the flow chart shown on FIG. 5 and the block diagram shown on FIG. 7. The 1D inversion model includes no borehole. The transmitters and receivers are represented mathematically as point dipoles located along a longitudinal tool axis. A multi-layer formation having a fixed depth w includes Nlayer anisotropic formation layers. Each formation layer is defined as having a horizontal and vertical resistivities $R_{hq}$ and $R_{vq}$ ($q=1, 2, \ldots$, Nlayer). The bed boundary locations are defined along the length w at locations $z_q$ ($q=1, 2, \ldots$, Nlayer) thereby defining the thicknesses of each layer (the thickness of the first layer is $z_1$ $z_0$, the thickness of the second layer is $z_2$ $z_1$, the thickness of the third layer is $z_3$ $z_2$, and so on). The multi-layer formation may be inclined with respect to the tool axis as indicated by formation dip angle DIP and a formation dip azimuth AZF. The formation dip angle and dip azimuth are constant across all layers. The formation resistivities $R_{hq}$ and $R_{vq}$, the bed boundary locations $z_q$, and the constant (or average) formation dip angle DIP and dip azimuth AZF are unknown and may be computed using the 1D inversion.

FIG. 7 depicts a block diagram of another disclosed method embodiment 300 for inverting electromagnetic logging while drilling data to compute multi-layer formation properties. The depicted block diagram may be thought of as including a two-step workflow. In step 1, depicted at 305, the electromagnetic logging data (obtained at 302) is processed to compute and remove borehole effects. In step 2, depicted at 315, the borehole corrected data computed in step 1 is processed using a 1D inversion to compute the multi-layer formation properties.

Electromagnetic voltage measurements are acquired at a computer processor at 302 (e.g., from an electromagnetic logging while drilling tool that acquired the voltage measurements while rotating in a wellbore as described above). For example, the voltage measurements may be obtained from the logging tool memory upon tripping the tool out of the wellbore or via a high bandwidth communication link (such as wired drill pipe) between the logging tool and a surface processor. A large number of voltage measurements are generally acquired. These measurements are represented in 302 by $VT_{ijklmp}$, where VT represent tool voltage measurements, i and j represent the transmitter and receiver stations (e.g., 1, 2), k and l represent the transmitting antenna and receiving antenna moment axes (e.g., x, y, z), m represents the voltage set (sub-cycle) at a single depth such that $m=1, 2, \ldots, N$, and p represents the number of depth cycles such that $p=1, 2, \ldots$, ndept. Measured or estimated drilling fluid resistivity values $RM_p$ and borehole diameter values $HD_p$ (where p is as defined above) are also acquired at 304.

At 306 (in step 1), the acquired tool voltage measurements are processed using an inversion model that includes tool and borehole details as well as a uniform anisotropic formation to compute various tool, borehole, and formation properties. For example, the inversion may be used to compute the horizontal and vertical resistivities of the uniform anisotropic formation $R_h$ and $R_v$, the mean position of the logging tool in the borehole $decc_{mean}$ and $\Psi_{mean}$, the formation dip and dip azimuth DIP and AZF, the resistivity of the drilling fluid RM, and the borehole diameter HD.

In block 308, modeled trans-impedance voltage responses $VM_{ijklm}$ are computed using the forward model and the outputs from block 306, where VM represents the modelled voltages. The modeled voltage response are further processed to compute a plurality Nc of compensated measurement quantities $CM_n$ (where CM represents the modeled compensated measurement quantities and $n=1, 2, \ldots, Nc$). These quantities may be computed, for example, as described above in Equations 15-20 and/or in the various cited references.

In block 310 modeled trans-impedance voltage responses $VMNBH_{ijklm}$ are computed using the formation property outputs ($R_h$, $R_v$, DIP, and AZF) from block 306 and a point dipole model with no borehole and point dipole transmitting and receiving antennas. VMNBH represents the modelled voltages in the absence of a borehole. The modeled voltage responses are further processed to compute a plurality Nc of compensated measurement quantities $CMNBH_n$ (where CMNBH represents the modeled compensated measurement quantities in the absence of a borehole and $n=1, 2, \ldots, Nc$). These quantities may be computed, for example, as described above in Equations 15-20 and/or in the various cited references.

At block 312 the borehole effects on the modeled compensated measurement quantities may be computed, for example, as follows:

$$\Delta CM_n = CM_n CMNBH_n, n=1,2,\ldots,Nc \quad (21)$$

where $\Delta CM_n$ represents the borehole effects on each of the $n=1, 2, \ldots$, Nc compensated measurement quantities.

At block 314, compensated measurements $CT_n$ are computed from the tool voltage measurements $VT_{ijklm}$ that were received at 306. These compensated quantities are further processed in combination with the borehole effects $\Delta CM_n$ computed in 312 to compute borehole corrected compensated quantities $CBHC_n$, for example, as follows:

$$CBHC_n = CT_n \Delta CM_n, n=1,2,\ldots,Nc \quad (22)$$

With respect to blocks 306, 308, 310, 312, and 314 (which collectively make up step 1 as depicted at 305), it will be understood that these blocks are repeated at each depth interval (at each depth p) such that the above described borehole and formation parameters, modeled voltages, and compensated quantities are computed independently at each depth (i.e., at $p=1$, $p=2$, and so on). Thus, each of these quantities may also be represented as including a subscript p, for example, $CBHC_{np}$ representing the $n=1, 2, \ldots$, Nc borehole corrected compensated measurement quantities at each of the $p=1, 2, \ldots$, ndept depth intervals.

As stated above, step 2 (depicted at 315) includes processing the borehole corrected measurements using a 1D inversion to compute the multi-layer formation properties. In particular, the compensated borehole corrected measurements $CBHC_{np}$ are processed at 316 using a 1D inversion in which the forward model includes point dipole transmitters and receivers without a tool body and without a borehole in a multi-layered anisotropic formation. The outputs 318 include the horizontal and vertical resistivities of each layer $R_{hq}$ and $R_{vq}$, the bed boundary locations $z_q$ ($q=1, 2, \ldots$, Nlayer), and the constant (or average) formation dip angle $DIP_{ave}$ and dip azimuth $AZF_{ave}$.

One advantageous feature of method 300 is that the borehole correction process in step 1 is configured to match the inversion engine in step 2 such that the correction acts as a bridge between the inversion model in block 306 and the layered formation model in block 316. In particular, matching point dipole models are used in blocks 310 and 316. In a uniform anisotropic formation the compensated tool measurements $CT_n$ may be about equal to the modeled compensated measurements $CM_n$ such that $CT_n \sim CM_n$. Thus, from Equations 21 and 22 the compensated borehole corrected measurements $CBHC_n$ may be about equal to the point dipole modeled compensated measurements $CMNBH_n$ such that $CBHC_n = CT_n \Delta CM_n \sim CMNBH_n$.

Another advantageous feature of method 300 is that the inversion engines employ fully gain compensated measurement quantities (e.g., as opposed to trans-impedance voltages or an apparent conductivity matrix). The borehole correction process described above with respect to FIG. 7 involves three distinct responses; (i) the actual tool measurements, (ii) model responses from a finite size antenna coil in a borehole, and (iii) model responses from a point dipole tool with no borehole in a layered formation. The magnitudes of these depend on the gains of the antennas in the tool and the models. In practice, the gains depend on the tool operating pressure and temperature (as well as other factors) and thus can change during a drilling operation. The compensated measurements disclosed herein are advantageously independent of gain (and gain variations) and therefore may provide accurate borehole effect measurements and corrections as well as accurate formation properties upon inversion.

Figure 8:
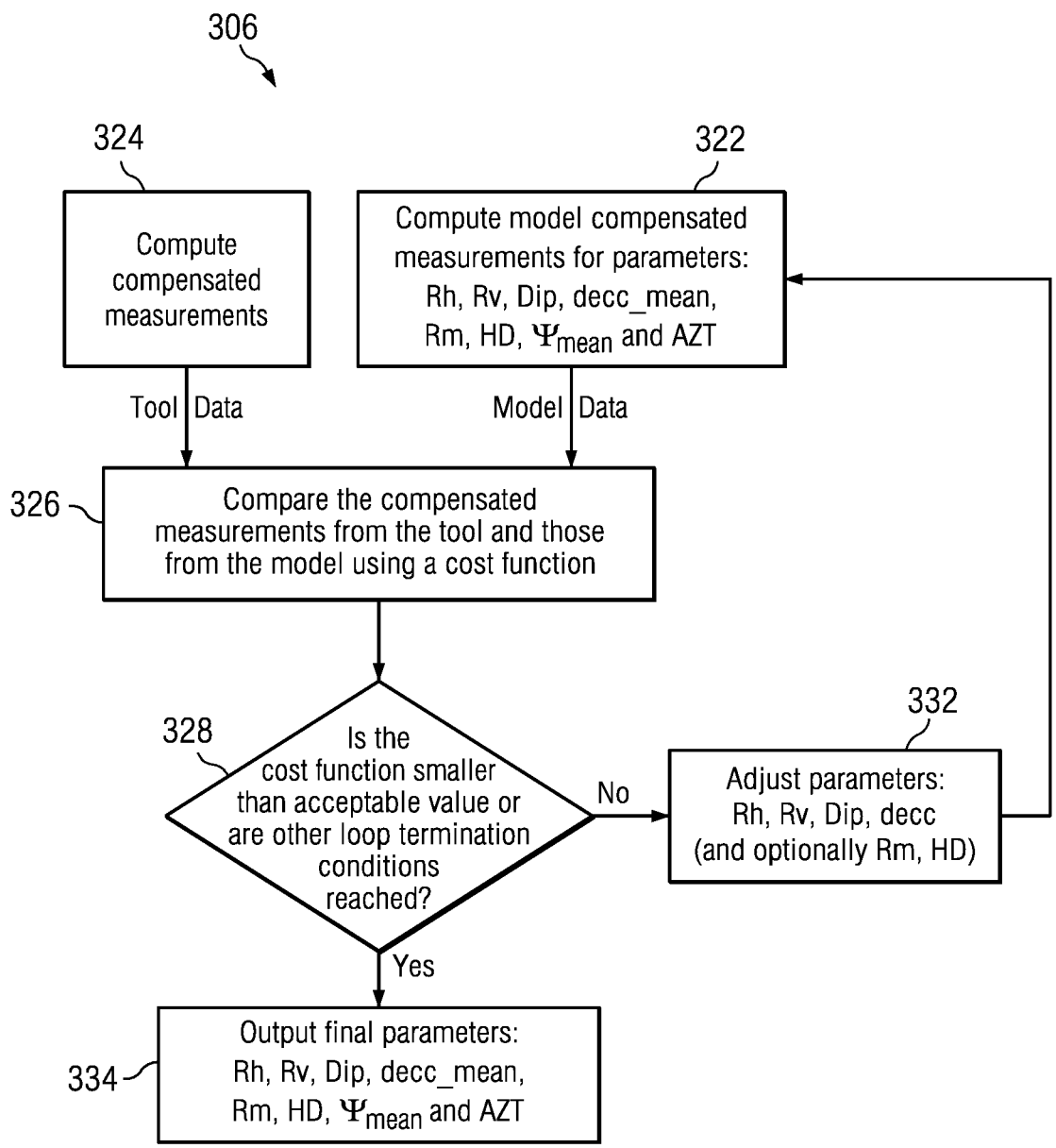
FIG. 8 depicts a block diagram that provides further detail regarding element 306 of one embodiment of FIG. 7.

FIG. 8 depicts a block diagram that provides further detail regarding element 306 of one embodiment of FIG. 7. Block 322 may be referred to as the forward model engine of the first inversion. It computes the model responses (model compensated quantities) for a given set of borehole/formation parameters, namely, in this example: $R_h$, $R_v$, $decc_{mean}$, $\Psi_{mean}$, DIP, AZF, RM, and HD. Of this list of parameters, some may be treated as known and thus not inverted (such as $\Psi_{mean}$, AZF, RM, and HD). The remaining parameters (e.g., $R_h$, $R_v$, decc, and DIP) are referred to as free parameters to be inverted. As described above, the model includes tool and borehole details as well as a uniform anisotropic formation. Finite element code may be used to generate the model responses (although such code tends to be too slow for real time while drilling applications). Alternatively, finite element code may be used to pre-compute a multi-dimensional response table in which each dimension corresponds to a borehole/formation parameter. The response table may then be stored in a computer so that the model responses at arbitrary borehole/formation parameter values may be quickly computed through interpolation. The disclosed embodiments are not limited in these regards.

Compensated measurement quantities are computed in block 324 using the acquired trans-impedance voltage measurements (at 302 in FIG. 7). It will be understood that to process a proper inversion the number of linearly independent compensated measurements generated in block 324 generally needs to exceed the number of free parameters in block 322. Substantially any number of the disclosed compensated measurement quantities may be computed in block 324.

The model quantities computed in 322 may be compared with the tool quantities computed in 324 using a cost function in block 326. The cost function may be configured to have a decreasing value as the model measurements approach the tool measurements. The cost function may be further configured to equal zero when the model measurements exactly match the corresponding tool measurements. Substantially any suitable cost function may be utilized, for example, including a quadratic form of the difference between the tool measurements and model responses. When the cost function is less than a predetermined threshold at 328 the present values of the borehole and formation parameters $R_h$, $R_v$, $decc_{mean}$, $\Psi_{mean}$, DIP, AZF, RM, and HD are output at 334. Otherwise, the free parameters (e.g., $R_h$, $R_v$, $decc_{mean}$, and DIP) may be adjusted at 332 and 322 the inversion loop repeated beginning at 322 as depicted.

Figure 9:
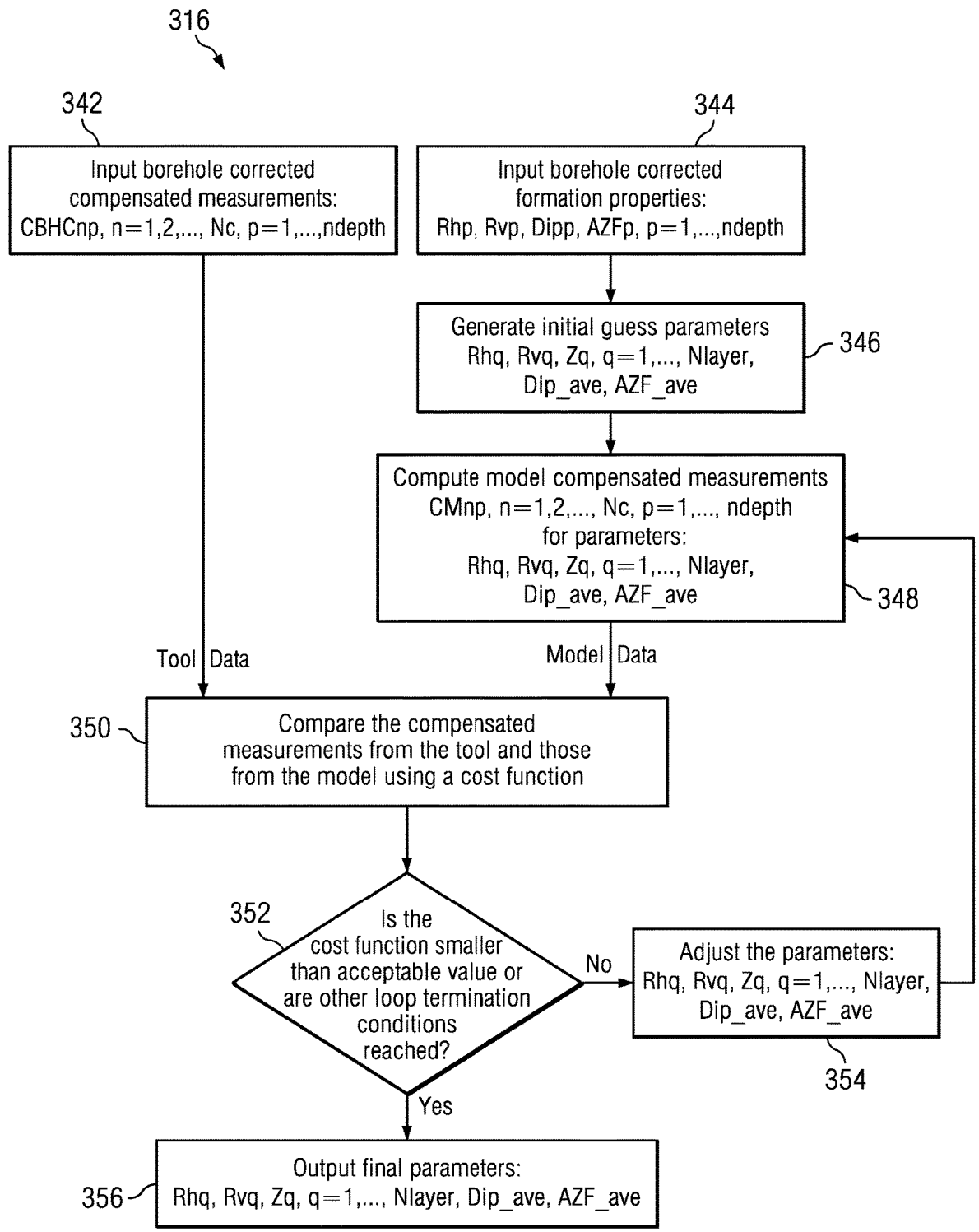
FIG. 9 depicts a block diagram that provides further detail regarding element 316 of one embodiment of FIG. 7.

FIG. 9 depicts a block diagram that provides further detail regarding element 316 of one embodiment of FIG. 7. Blocks 342 and 344 describe inputs to the 1D inversion. Block 342 includes the borehole corrected compensated measurements $CBHC_{np}$ from block 314 of FIG. 7. Note that there are n=1, 2, . . . , Nc borehole corrected compensated measurement quantities at each of the p=1, 2, . . . , ndept depths. Block 344 receives $R_{hp}$, $R_{vp}$, $DIP_p$ and $AZF_p$ values from block 306 of FIG. 7 (note that these measurements are received for each depth interval and thus include the subscript p).

Block 346 processes $R_{hp}$, $R_{vp}$, $DIP_p$ and $AZF_p$ values from block 344 to compute initial estimated parameters for the 1D inversion. With reference again to FIG. 6, the estimated parameters may include the horizontal and vertical resistivities of each of the layers, $R_{hq}$ and $R_{vq}$, the locations (depths) of the bed boundaries $z_q$, and the average dip angle and dip azimuth $DIP_{ave}$ and $AZF_{ave}$.

In one example embodiment a first method for establishing the initial estimates is employed when the average dip angle $DIP_{ave}$ is less than a threshold (a low angle well condition) and a second method for establishing the initial estimates is employed when the $DIP_{ave}$ is greater than the threshold (a high angle well condition). The average dip angle $DIP_{ave}$ may be computed, for example as follows:

$$DIP_{ave} = \frac{1}{ndept} \sum_{p=1}^{ndepth} DIP_p$$

Substantially any threshold may be used for distinguishing between low and high angle well conditions. For example only, the threshold may be 75 degrees such that low angle conditions apply when $DIP_{ave} \leq 75°$ and high angle conditions apply when $DIP_{ave} > 75°$. Generally, during low angle conditions the logging tool traverses multiple formation layers and therefore multiple boundaries (e.g., as depicted on FIG. 6). During high angle conditions the logging tool generally traverses only a few (or no) layers/boundaries. As $DIP_{ave}$ approaches 90 degrees, the logging tool may reside in a single layer.

Figure 10A:
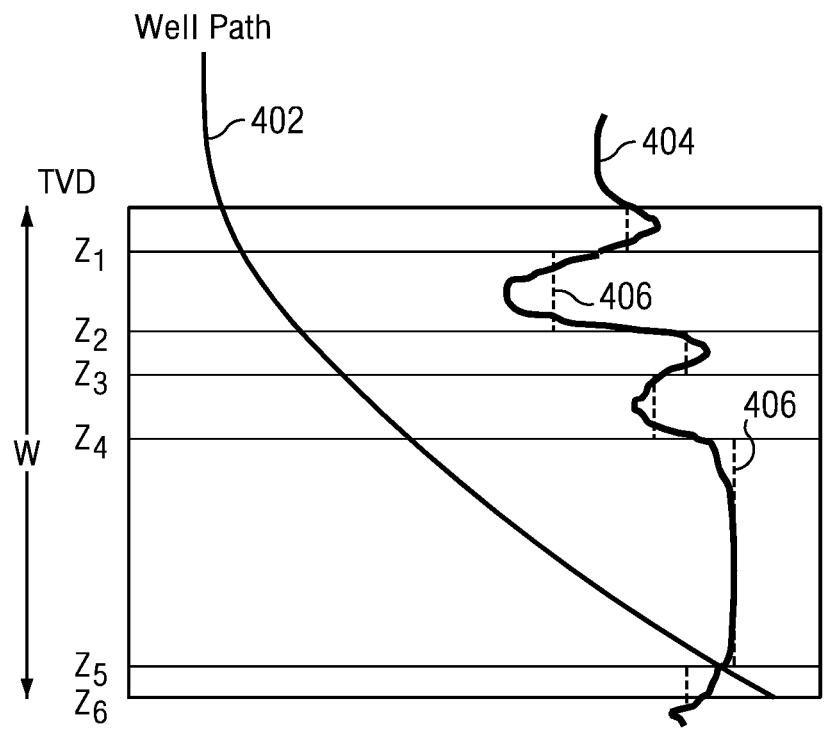
FIGS. 10A and 10B depict example well paths versus depth w in a multi-layer formation model.

FIG. 10A depicts an example well path 402 versus depth w through multiple formation layers and boundaries (where w represents depth on a total vertical depth TVD scale). This example is representative of a low angle operation in which the well path traverses several layers. A log 404 of the horizontal resistivity $R_h$ versus w is also depicted.

In this low angle example, the bed boundary depths $z_q$ may be estimated by solving for the locations (depths) of the inflection points in the $R_h$ log 404. This may be accomplished by solving for the depths w at which the second derivative of the $R_h$ log 404 with respect to depth w is equal to zero, for example, as follows:

$$z_q = w_q; w \; ere \; \left[\frac{d^2(R_h)}{dw^2} = 0\right]_q \quad (23)$$

Note that the number of layers selected in the 1D inversion is indeterminate (not fixed), but may be selected based on the measured data, for example, based on the number of zeros in the second derivative of the $R_h$ log. The initial estimates for $R_{hq}$ and $R_{vq}$ may be obtained by computing the inverse of the averaged horizontal and vertical conductivities in each of the layers, for example, as follows:

$$R_{hq} = \frac{1}{\frac{1}{N_q}\sum_{s=1}^{N_1}\frac{1}{R_{hs}}} \quad (24)$$

$$R_{vq} = \cfrac{1}{\cfrac{1}{N_q}\sum_{s=1}^{N_q}\cfrac{1}{R_{vs}}}$$

where s=1, 2, ..., $N_q$ represent the depth sample points with the q-th layer. $R_{hq}$ is depicted on FIG. 10A as the vertical dotted lines (at 406). The average formation dip azimuth $AZF_{ave}$ may be computed, for example, as follows:

$$AZF_{ave} = \qquad\qquad\qquad (25)$$
$$\text{MOD}\left(\text{atan2}\left(\frac{1}{ndepth}\sum_{p=1}^{ndepth}\sin(AZF_p), \frac{1}{ndepth}\sum_{p=1}^{ndepth}\cos(AZF_p)\right), 360\right)$$

where a tan 2(•) represents the four quadrant inverse tangent function and MOD(•) represents the modulo operation which gives the remainder after division.

Figure 10B:
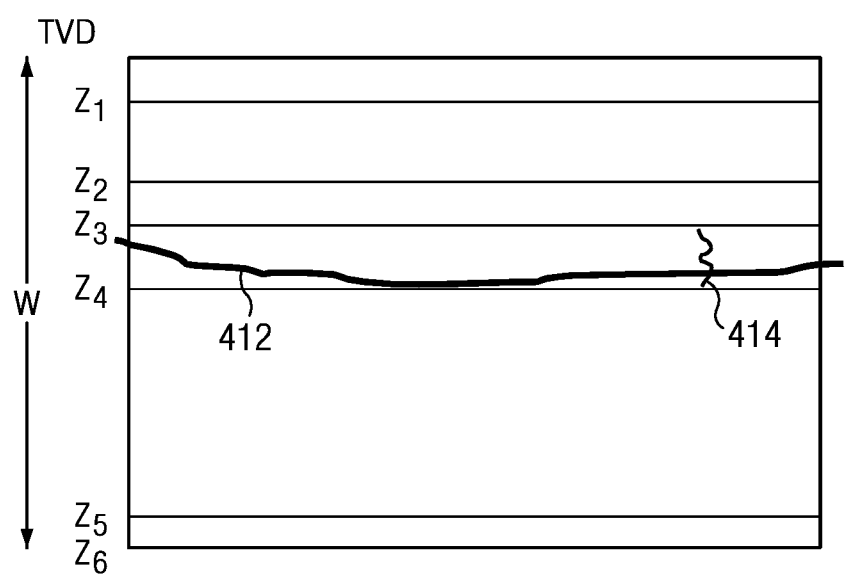

FIG. 10B depicts an example well path 412 versus depth w (where w represents depth on a total vertical depth TVD scale). This example is representative of a high angle operation in which the well path remains in a single layer. A log 414 of the horizontal resistivity $R_h$ versus w is also depicted. In this example, the variation in $R_h$ is primarily due to the variation in the distance of the well path 412 from the nearest bed boundary.

In a high angle operation it may be advantageous to utilize a 1D inversion model employing a fixed number of layers (since the wellbore likely crosses few, if any, boundaries). For example, the 1D inversion model may arbitrarily be selected to include 2, 3, or 4 layers. The initial estimates of the horizontal and vertical resistivities of each layer may be obtained, for example, by simply averaging the values over the entire depth cycle as follows:

$$R_{hq} = R_{h,ave} = \cfrac{1}{\cfrac{1}{ndepth}\sum_{s=1}^{ndepth}\cfrac{1}{R_{hp}}} \qquad (24)$$

$$R_{vq} = R_{v,ave} = \cfrac{1}{\cfrac{1}{ndepth}\sum_{p=1}^{ndepth}\cfrac{1}{R_{vp}}}$$

Moreover, the bed boundary locations (depths) may be selected arbitrarily, for example, by dividing the depth w into equal intervals. The average resistivity $R_{h,ave}$ may also be used to determine a maximum range of $z_q$. A higher $R_{h,ave}$ value implies that the tool is in a high resistivity environment with a larger range of investigation, i.e., a larger range for $z_q$. Conversely, a lower $R_{h,ave}$ implies that a smaller range of $z_q$ may be appropriate.

With reference again to FIG. 9, block 348, which depicts the forward 1D model engine, is configured to compute model compensated measurement quantities $CM_{np}$ based upon the current values of $R_{hq}$, $R_{vq}$, $z_q$, $DIP_{ave}$, and $AZF_{ave}$. Various analytical methods are known for making such computations, for example, as disclosed by Anderson in "*Modeling and Inversion Methods for the Interpretation of Resistivity Logging Tool Response*", p. 285-293, DUP Science, ISBN 90-407-2231-5.

Block 350 compares the modeled compensated measurements $CM_{np}$ with the borehole corrected compensated measurements $CBHC_{np}$ input in 342 using a cost function. The cost function may be configured to have a decreasing value when the model measurements more closely match the corrected tool measurements. The cost function may be further configured to equal zero when the model measurements exactly match the corresponding tool measurements. Example cost functions may be represented mathematically, for example, as follows:

$$C = \frac{1}{ndept \times Nc}\sum_{p=1}^{ndepth}\sum_{n=1}^{Nc}w_{np}(CBHC_{np} - CM_{np})^2$$

$$C = \frac{1}{ndept \times Nc}\sum_{p=1}^{ndepth}\sum_{n=1}^{Nc}w_{np}\text{abs}(CBHC_{np} - CM_{np})$$

where C represents the cost function, Nc represents the number of compensated measurements, ndept represent the number of depth intervals and $w_{np}$ represent weighing coefficients of the n-th compensated measurement at the p-th depth interval. The cost function may further optionally include regularization terms such that it generates smoother outputs for noisy input data condition, although the disclosure is by no means limited in this regard.

When the cost function is less than a predetermined threshold at 352 the present values of the multi-layer formation parameters $R_{hq}$, $R_{vq}$, $z_q$, $DIP_{ave}$, and $AZF_{ave}$ are output at 356. Various inversion parameters may also be output at 356. Otherwise, these parameters are adjusted at 354 and then used to compute new modeled compensated measurement quantities at 348.

It will be understood that blocks 348, 350, 352, and 354 form an inversion loop. The number of times the algorithm loops through block 352, $N_{loop}$, may be recorded and used for determining loop termination in the event that there is no convergence. Loop exiting criteria may include, for example, (i) the number of iterations $N_{loop}$ exceeds a threshold, (ii) the cost function is less than a threshold indicating convergence, and (iii) a difference between successive cost function computations is less than a threshold indicating convergence.

It will be understood that the various methods disclosed herein for inverting electromagnetic logging data may be implemented on a on a computer, for example, including one or more microprocessors and electronic memory. The computer may be configured to acquire the logging data from an electromagnetic logging tool, for example, after the tool has been removed from the subterranean wellbore (e.g., via a communications link). Alternatively, the computer may be configured to acquire logging data from the electromagnetic logging tool in substantially real time while the tool is making measurements (e.g., via high bandwidth wired drill pipe telemetry system). The computer may be further configured to execute the various method embodiments discloses herein, for example, in FIGS. 4, 5, 7, 8, and 9, and process one or more of the disclosed mathematical equations.

Although methods for inverting electromagnetic logging measurements have been described in detail, it should be understood that various changes, substitutions and alternations can be made herein without departing from the spirit and scope of the disclosure as defined by the appended claims.

What is claimed is:

1. A method for computing multi-layer subterranean formation properties, the method comprising:
   (a) causing an electromagnetic logging while drilling tool to acquire electromagnetic voltage measurements while rotating in a subterranean borehole;
   (b) processing the electromagnetic voltage measurements to compute a plurality of gain compensated measurement quantities;
   (c) processing the gain compensated measurement quantities using a first inversion to compute a corresponding set of borehole corrected gain compensated measurement quantities, the first inversion including a mathematical model of the tool and the borehole in a uniform, anisotropic formation;
   (d) processing the borehole corrected gain compensated measurement quantities using a second inversion to compute multi-layer anisotropic formation properties, the second inversion including a 1D inversion employing a point dipole model and a multi-layer formation model.

2. The method of claim 1, wherein (a) further comprises:
   (i) rotating the electromagnetic logging while drilling tool in the subterranean borehole, the logging while drilling tool including a transmitter axially spaced apart from a receiver, the transmitter including an axial transmitting antenna and at least one transverse transmitting antenna, the receiver including an axial receiving antenna and at least one transverse receiving antenna;
   (ii) causing the axial transmitting antenna and the at least one transverse transmitting antenna to sequentially transmit corresponding electromagnetic waves into the subterranean wellbore;
   (iii) using the axial receiving antenna and the at least one transverse receiving antenna to receive the electromagnetic voltage measurements corresponding to the electromagnetic waves transmitted in (ii).

3. The method of claim 2, wherein the electromagnetic logging while drilling tool includes at least first and second axially spaced transmitters and receivers, each of the transmitters including collocated triaxial transmitting antennas and each of the receivers including collocated triaxial receiving antennas.

4. The method of claim 1, wherein (b) further comprises:
   (i) processing the electromagnetic voltage measurements to compute corresponding harmonic voltage coefficients; and
   (ii) processing ratios of selected ones of the harmonic voltage coefficients to compute the gain compensated measurement quantities.

5. The method of claim 1, wherein (c) further comprises:
   (i) processing the gain compensated measurement quantities using the first inversion to compute borehole and formation properties;
   (ii) processing the borehole and formation properties computed in (i) using the mathematical model to compute a first set of modeled gain compensated quantities;
   (iii) processing the formation properties obtained in (i) using a point dipole model to compute a second set of modeled gain compensated quantities;
   (iv) processing differences between the first and second sets of modeled gain compensated quantities to compute borehole effects;
   (v) subtracting the borehole effects from the gain compensated measurement quantities computed in (b) to compute the borehole corrected gain compensated measurement quantities.

6. The method of claim 5, wherein the borehole and formation properties computed in (i) comprise a resistivity of drilling fluid in the borehole, a borehole diameter, a mean position of the logging while drilling tool in the borehole, horizontal and vertical resistivities of the uniform anisotropic formation, and a formation dip and dip azimuth.

7. The method of claim 1, wherein the multi-layer formation properties computed in claim 1 comprise horizontal and vertical resistivities of each of said multiple formation layers, bed boundary depths between each of said multiple formation layers, and average formation dip and dip azimuth.

8. The method of claim 1, wherein:
   (c) is repeated a plurality of times at a corresponding plurality of distinct depths to compute a corresponding group of the borehole corrected gain compensated measurement quantities; and
   (d) comprises processing the group of the borehole corrected gain compensated measurement quantities using the second inversion to compute the multi-layer anisotropic formation properties.

9. The method of claim 1, wherein (d) further comprises:
   (i) processing formation properties of the uniform, anisotropic formation to compute initial estimates of the multi-layer anisotropic formation properties;
   (ii) processing the initial estimates and the borehole corrected gain compensated measurement quantities using the second inversion to compute the multi-layer anisotropic formation properties.

10. The method of claim 9, wherein initial estimates of bed boundary locations are obtained by processing roots of a second derivative of a resistivity log versus depth.

11. The method of claim 10, wherein initial horizontal and vertical resistivity estimates are obtained by computing horizontal and vertical resistivity averages between said estimated bed boundary locations.

12. The method of claim 1, wherein each of the first and second inversions are processed using a cost function.

13. A method for computing multi-layer subterranean formation properties, the method comprising:
   (a) causing an electromagnetic logging while drilling tool to acquire electromagnetic voltage measurements while rotating in a subterranean borehole;
   (b) processing the electromagnetic voltage measurements using a first inversion to compute borehole and formation properties, the first inversion including a mathematical model of the tool and the borehole in a uniform, anisotropic formation;
   (c) processing the borehole and formation properties computed in (b) using the mathematical model to compute a first set of modeled measurement quantities;
   (d) processing the formation properties obtained in (b) using a point dipole model to compute a second set of modeled measurement quantities;
   (e) processing differences between the first and second sets of modeled measurement quantities to compute borehole effects;
   (f) subtracting the borehole effects from the electromagnetic voltage measurements acquired in (a) to compute borehole corrected measurement quantities; and
   (g) processing the borehole corrected measurement quantities using a second inversion to compute multi-layer anisotropic formation properties, the second inversion including a 1D inversion employing a point dipole model and a multi-layer formation model.

14. A method for computing multi-layer subterranean formation properties, the method comprising:

(a) causing an electromagnetic logging while drilling tool to acquire electromagnetic voltage measurements while rotating in a subterranean borehole;
(b) processing the electromagnetic voltage measurements using a first inversion to compute borehole and formation properties, the first inversion including a mathematical model of the tool and the borehole in a uniform, anisotropic formation;
(c) processing the borehole and formation properties computed in (b) using the mathematical model to compute a first set of modeled gain compensated measurement quantities;
(d) processing the formation properties obtained in (b) using a point dipole model to compute a second set of modeled gain compensated measurement quantities;
(e) processing differences between the first and second sets of modeled measurement quantities to compute borehole effects;
(f) processing the electromagnetic voltage measurements acquired in (a) to compute a plurality of gain compensated measurement quantities;
(g) subtracting the borehole effects computed in (e) from the gain compensated measurement quantities computed in (f) to compute borehole corrected measurement quantities; and
(h) processing the borehole corrected measurement quantities using a second inversion to compute multi-layer anisotropic formation properties, the second inversion including a 1D inversion employing a point dipole model and a multi-layer formation model.

15. The method of claim 14, wherein the logging while drilling tool includes a transmitter axially spaced apart from a receiver, the transmitter including an axial transmitting antenna and at least one transverse transmitting antenna, the receiver including an axial receiving antenna and at least one transverse receiving antenna, and further comprising:
   causing the axial transmitting antenna and the at least one transverse transmitting antenna to sequentially transmit corresponding electromagnetic waves into the subterranean wellbore; and
   using the axial receiving antenna and the at least one transverse receiving antenna to receive the electromagnetic voltage measurements corresponding to the transmitted electromagnetic waves.

16. The method of claim 15, wherein the logging while drilling tool includes at least first and second axially spaced transmitters and receivers, each of the transmitters including collocated triaxial transmitting antennas and each of the receivers including collocated triaxial receiving antennas.

17. The method of claim 14, wherein (c) further comprises:
   (i) processing the electromagnetic voltage measurements to compute corresponding harmonic voltage coefficients; and
   (ii) processing ratios of selected ones of the harmonic voltage coefficients to compute the gain compensated measurement quantities.

18. The method of claim 14, wherein the borehole and formation properties computed in (c) comprise a resistivity of drilling fluid in the borehole, a borehole diameter, a mean position of the logging while drilling tool in the borehole, horizontal and vertical resistivities of the uniform anisotropic formation, and a formation dip and dip azimuth.

19. The method of claim 14, wherein the multi-layer formation properties comprise horizontal and vertical resistivities of each of said multiple formation layers, bed boundary depths between each of said multiple formation layers, and average formation dip and dip azimuth.

20. The method of claim 14, wherein (b) further comprises:
   (i) processing formation properties of the uniform, anisotropic formation to compute initial estimates of the multi-layer anisotropic formation properties; and
   (h) further comprises:
   (ii) processing the initial estimates and the borehole corrected gain compensated measurement quantities using the second inversion to compute the multi-layer anisotropic formation properties.

* * * * *